(12) United States Patent
Kim et al.

(10) Patent No.: US 11,927,253 B2
(45) Date of Patent: *Mar. 12, 2024

(54) POWERTRAIN FOR ELECTRIC VEHICLE

(71) Applicants: HYUNDAI MOTOR COMPANY, Seoul (KR); KIA CORPORATION, Seoul (KR)

(72) Inventors: Jin Ho Kim, Suwon-si (KR); Jae Joon Lee, Anyang-si (KR); Jong Sool Park, Hwaseong-si (KR); Jin Young Hwang, Yongin-si (KR); Jong Sung Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,475

(22) Filed: Nov. 19, 2021

(65) Prior Publication Data

US 2022/0074474 A1    Mar. 10, 2022

Related U.S. Application Data

(63) Continuation-in-part of application No. 16/887,267, filed on May 29, 2020, now Pat. No. 11,181,174.

(30) Foreign Application Priority Data

Nov. 7, 2019 (KR) .................. 10-2019-0141771
Feb. 28, 2020 (KR) .................. 10-2020-0025247

(51) Int. Cl.
*F16H 37/06*  (2006.01)
*B60K 1/02*  (2006.01)
(Continued)

(52) U.S. Cl.
CPC ............. *F16H 37/046* (2013.01); *B60K 1/02* (2013.01); *B60K 17/02* (2013.01); *B60K 17/22* (2013.01);
(Continued)

(58) Field of Classification Search
CPC ............ F16H 37/046; F16H 2003/445; F16H 2200/0021; F16H 2200/0043;
(Continued)

(56) References Cited

U.S. PATENT DOCUMENTS 5,775,449 A     7/1998   Moroto et al.
6,958,028 B2   10/2005  Janson et al.
(Continued)

FOREIGN PATENT DOCUMENTS

CN    104948716 A    9/2015
CN    110053467 A    7/2019
(Continued)

OTHER PUBLICATIONS

Notice of Allowance dated Feb. 18, 2021 for the corresponding U.S. Appl. No. 16/884,306, 19 pages.
(Continued)

*Primary Examiner* — Roger L Pang
(74) *Attorney, Agent, or Firm* — Lempia Summerfield Katz LLC

(57) ABSTRACT

A powertrain for an electric vehicle includes: a planetary gear having a first rotating element, a second rotating element, and a third rotating element, wherein a first rotating element is connected to a first shaft and the second rotating element is connected to a second shaft; a first motor configured to selectively supply power to the first shaft at two or more gear ratios; a first shift assembly configured to transfer power of the first motor to the first shaft through one of two or more external engagement gear trains having (Continued)

different gear ratios; and a second motor configured to selectively supply power to the first shaft and the second shaft. The third shaft is fixedly disposed on a transmission housing, and any two shafts among the first, second and third shafts restrain each other.

9 Claims, 3 Drawing Sheets

(51) Int. Cl.
*B60K 17/02* (2006.01)
*B60K 17/22* (2006.01)
*F16H 37/04* (2006.01)
*F16H 3/44* (2006.01)

(52) U.S. Cl.
CPC ....... *F16H 37/06* (2013.01); *F16H 2003/445* (2013.01); *F16H 2200/0021* (2013.01); *F16H 2200/0052* (2013.01); *F16H 2200/2005* (2013.01); *F16H 2200/2094* (2013.01)

(58) Field of Classification Search
CPC ..... F16H 2200/0052; F16H 2200/2005; F16H 2200/2094; F16H 37/04; F16H 374/06; B60K 1/02
USPC ............................................ 475/5, 207, 218
See application file for complete search history.

(56) References Cited

U.S. PATENT DOCUMENTS

| | | | |
|---|---|---|---|
| 7,261,670 B2 | 8/2007 | Endo et al. | |
| 7,469,609 B2 | 12/2008 | Baldwin | |
| 8,051,732 B2 | 11/2011 | Gitt | |
| 8,257,213 B2 | 9/2012 | Komada et al. | |
| 9,260,109 B2 | 2/2016 | Tanaka | |
| 9,327,713 B2 | 5/2016 | Kaltenbach | |
| 9,346,462 B2 | 5/2016 | Park | |
| 9,528,583 B2 | 12/2016 | Lübke et al. | |
| 10,047,840 B2 | 8/2018 | Gumpoldsberger | |
| 10,081,240 B2 | 9/2018 | Lee et al. | |
| 10,724,616 B2 | 7/2020 | Katsura et al. | |
| 10,788,110 B2 | 9/2020 | Katsura et al. | |
| 11,181,174 B2* | 11/2021 | Kim ..................... F16H 37/046 | |
| 2002/0088291 A1 | 7/2002 | Bowen | |
| 2002/0189397 A1 | 12/2002 | Sakamoto et al. | |
| 2003/0100395 A1 | 5/2003 | Hiraiwa | |
| 2005/0164827 A1 | 7/2005 | Beaty et al. | |
| 2005/0204837 A1 | 9/2005 | Janson et al. | |
| 2006/0025272 A1 | 2/2006 | Pelouch | |
| 2007/0149334 A1 | 6/2007 | Holmes et al. | |
| 2008/0108467 A1 | 5/2008 | Hiraki et al. | |
| 2008/0194369 A1 | 8/2008 | Boutou et al. | |
| 2008/0200296 A1 | 8/2008 | Holmes | |
| 2009/0011887 A1 | 1/2009 | Komada et al. | |
| 2009/0151491 A1 | 6/2009 | Tabata et al. | |
| 2009/0166107 A1 | 7/2009 | Robart et al. | |
| 2010/0051360 A1 | 3/2010 | Oba et al. | |
| 2010/0160103 A1 | 6/2010 | Holmes | |
| 2011/0184612 A1 | 7/2011 | Fujii et al. | |
| 2012/0316738 A1 | 12/2012 | Teslak et al. | |
| 2013/0288850 A1 | 10/2013 | Kaltenbach | |
| 2014/0349799 A1* | 11/2014 | Kaltenbach ............ B60K 6/365 475/5 |
| 2015/0068336 A1 | 3/2015 | Peterson et al. | |
| 2015/0292606 A1 | 10/2015 | Lbke | |
| 2016/0167639 A1 | 6/2016 | Hori et al. | |
| 2016/0312857 A1 | 10/2016 | Wechs | |
| 2017/0009862 A1 | 1/2017 | Gumpoldsberger et al. | |
| 2017/0159779 A1 | 6/2017 | Hwang et al. | |
| 2017/0282700 A1 | 10/2017 | Bergquist et al. | |
| 2018/0099561 A1 | 4/2018 | Xu et al. | |
| 2018/0304733 A1 | 10/2018 | Katsura et al. | |
| 2018/0304896 A1 | 10/2018 | Katsura et al. | |
| 2018/0313439 A1 | 11/2018 | Katsura et al. | |
| 2019/0118635 A1 | 4/2019 | Hwang et al. | |
| 2019/0360558 A1 | 11/2019 | Eo et al. | |
| 2020/0047602 A1 | 2/2020 | Chae et al. | |

FOREIGN PATENT DOCUMENTS

| | | |
|---|---|---|
| DE | 102008002380 A1 | 12/2009 |
| DE | 102010030569 A1 | 12/2011 |
| DE | 102012220063 A1 | 5/2014 |
| DE | 102013214238 A1 | 1/2015 |
| DE | 112015000830 A5 | 11/2016 |
| DE | 112016004784 T5 | 7/2018 |
| DE | 102018221603 A1 | 6/2020 |
| DE | 102018222258 A1 | 6/2020 |
| DE | 102019209985 A1 | 1/2021 |
| JP | 2002176703 A | 6/2002 |
| KR | 20080087907 A | 10/2008 |
| KR | 20130117184 A | 10/2013 |
| KR | 20140118028 A | 10/2014 |
| KR | 20160051051 A | 5/2016 |
| KR | 20190066675 A | 6/2019 |
| KR | 20190134147 A | 12/2019 |
| WO | 2021073748 A1 | 4/2021 |

OTHER PUBLICATIONS

Office Action dated Apr. 13, 2021 from corresponding U.S. Appl. No. 16/993,436, 31 pp.
Office Action dated Feb. 18, 2021 for the corresponding U.S. Appl. No. 16/882,299, 26 pages.
Notice of Allowance dated Dec. 9, 2022 for the corresponding U.S. Appl. No. 17/339,266.
Office Action dated May 5, 2022 for the corresponding U.S. Appl. No. 17/339,266.
Office Action issued in related U.S. Appl. No. 17/531,454, dated Oct. 25, 2022, 12pp.
Notice of Allowance dated Apr. 19, 2022 for the corresponding Korean Patent No. 10-2020-0145399.
Office Action dated Jun. 14, 2022 for the corresponding U.S. Appl. No. 17/243,995.
Office Action cited in German patent application No. 10 2020 208 656.7; dated Oct. 10, 2023; 9 pp.
Office Action cited in German patent application No. 10 2020 211 243.6; dated Oct. 17, 2023; 13 pp.
Office Action cited in German patent application No. 10 2020 118 698.3; dated Nov. 10, 2023; 15 pp.
Office Action cited in German patent application No. 10 2020 118 918.4; dated Nov. 28, 2023; 9 pp.

* cited by examiner

FIG. 3

| GEAR STAGE | S1 | | S2 | | S3 | |
|---|---|---|---|---|---|---|
| | a | b | c | d | e | f |
| 1 | ● | | ● | | ● | |
| 2 | | ● | ● | | ● | |
| 3 | | ● | | ● | ● | |
| 4 | ● | | | ● | | ● |
| 5 | ● | | ● | | | ● |
| 6 | | ● | ● | | | ● |

POWERTRAIN FOR ELECTRIC VEHICLE

CROSS-REFERENCE TO RELATED APPLICATION

This application is a continuation-in-part application of non-provisional U.S. patent application Ser. No. 16/887,267, filed on May 29, 2020, which claims priority to and the benefit of Korean Patent Application Nos. 10-2019-0141771, filed on Nov. 7, 2019 and 10-2020-0025247, filed on Feb. 28, 2020, the entire contents of each of which are incorporated herein by reference.

FIELD

The present disclosure relates to technology of powertrains provided in electric vehicles.

BACKGROUND

The statements in this section merely provide background information related to the present disclosure and may not constitute prior art.

Electric vehicles (EVs) are vehicles using power provided by electric motors for propulsion. Such electric vehicles can significantly contribute to the reduction of environmental pollution in metropolitan areas in that there are no emissions.

For the popularization of such electric vehicles, the improvement of various technologies is desired. In particular, a technology for significantly increasing a drivable range after charged once is desired.

To increase the drivable range, vehicles should be able to satisfy maximum gradeability and maximum speed desired for a vehicle while improving fuel efficiency (i.e., a driving range per unit of electrical energy (km/kWh)) by reducing the size and capacity of a motor disposed in an electric vehicle. In this regard, a transmission is disposed in an electric vehicle.

For the above-described reasons, the transmission disposed in the electric vehicle has high power transfer efficiency due to a relatively simple configuration while avoiding either torque interruption in which torque transferred to driving wheels is interrupted or a gear shifting shock during gear shifting.

The information disclosed in the Background of the Disclosure section is only for the enhancement of understanding of the background of the disclosure, and should not be taken as an acknowledgment or as any form of suggestion that this information forms a prior art that would already be known to a person skilled in the art.

SUMMARY

The present disclosure provides a powertrain for an electric vehicle, and the powertrain is able to satisfy maximum gradeability and maximum speed desired for a vehicle while reducing the capacity of a motor by providing a plurality of shift ratios, to improve electrical efficiency of the vehicle by realizing high power transfer efficiency using a relatively simple configuration and a relatively small weight, and to prevent torque interruption and shift shock.

In accordance with an aspect of the present disclosure, a powertrain for an electric vehicle may include: a planetary gear having three rotating elements (i.e., first, second and third rotating elements), where the first rotating element is connected to a first shaft and the second rotating element is connected to a second shaft; a first motor installed to selectively supply power to the first shaft at two or more gear ratios; a first shift assembly configured to transfer power of the first motor to the first shaft through one of two or more external engagement gear trains having different gear ratios; and a second motor installed to selectively supply power to the first shaft and the second shaft.

The third rotating element of the planetary gear may be selectively connected to a transmission housing, and two rotating elements among the three rotating elements of the planetary gear may be selected to be connected to each other, such that the entire planetary gear is rotated integrally.

The powertrain may be configured such that: the first shift assembly includes a gear engagement unit, a hub and a sleeve of which are provided on a rotating shaft of the first motor; a first gear and a second gear are rotatably provided on both sides of the hub, respectively; a third gear in external engagement with the first gear and a fourth gear in external engagement with the second gear are coaxially connected to each other; a fifth gear is disposed on the shaft of the third gear and the fourth gear such that rotation of the fifth gear is restrained; and a sixth gear in external engagement with the fifth gear is disposed on the first shaft such that rotation of the sixth gear is restrained.

The powertrain may be configured such that: the first shift assembly includes a gear engagement unit, a hub and a sleeve of which are provided on a rotating shaft of the first motor; a first gear and a second gear are rotatably provided on both sides of the hub, respectively; and each of a third gear in external engagement with the first gear and a fourth gear in external engagement with the second gear is disposed on the first shaft such that rotation of the third gear and the fourth gear is restrained.

The powertrain may be configured such that: a seventh gear is connected to the first shaft such that rotation of the seventh gear is restrained; an eighth gear is connected to the second shaft such that rotation of the eighth gear is restrained; a ninth gear in external engagement with the seventh gear and a tenth gear in external engagement with the eighth gear are disposed coaxially with each other; and the second motor is disposed to be connectable to the first shaft and the second shaft via a second shift assembly disposed between the ninth gear and the tenth gear.

The second shift assembly may include a gear engagement unit, a hub and a sleeve of which are provided on a rotating shaft of the ninth gear and the tenth gear.

The powertrain may be configured such that: the second motor is disposed such that a rotating shaft of the second motor is parallel to the first shaft; and the power provided by the second motor is transmitted to the first shaft or the second shaft through an eleventh gear disposed on the rotating shaft of the second motor and a twelfth gear in external engagement with the eleventh gear and disposed coaxially with the ninth gear and the tenth gear.

The powertrain may be configured such that: the second motor is disposed such that the first shaft passes through the interior of the second motor; and the eleventh gear is disposed to be coaxial with the first shaft.

The powertrain may further include a third shift assembly configured to fix the third rotating element of the planetary gear to the transmission housing or connect the third rotating element of the planetary gear to the second shaft by linear displacement in the axial direction of the first shaft.

The present disclosure can satisfy maximum gradeability and maximum speed required for a vehicle while reducing the capacity of a motor by providing a plurality of shift ratios, improve electrical efficiency of the vehicle by realizing high power transfer efficiency using a relatively simple configuration and a relatively small weight, and prevent torque interruption and shift shock.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a table illustrating operating modes of first and second forms of the powertrain for the electric vehicle according to the present disclosure.

Figure 1:
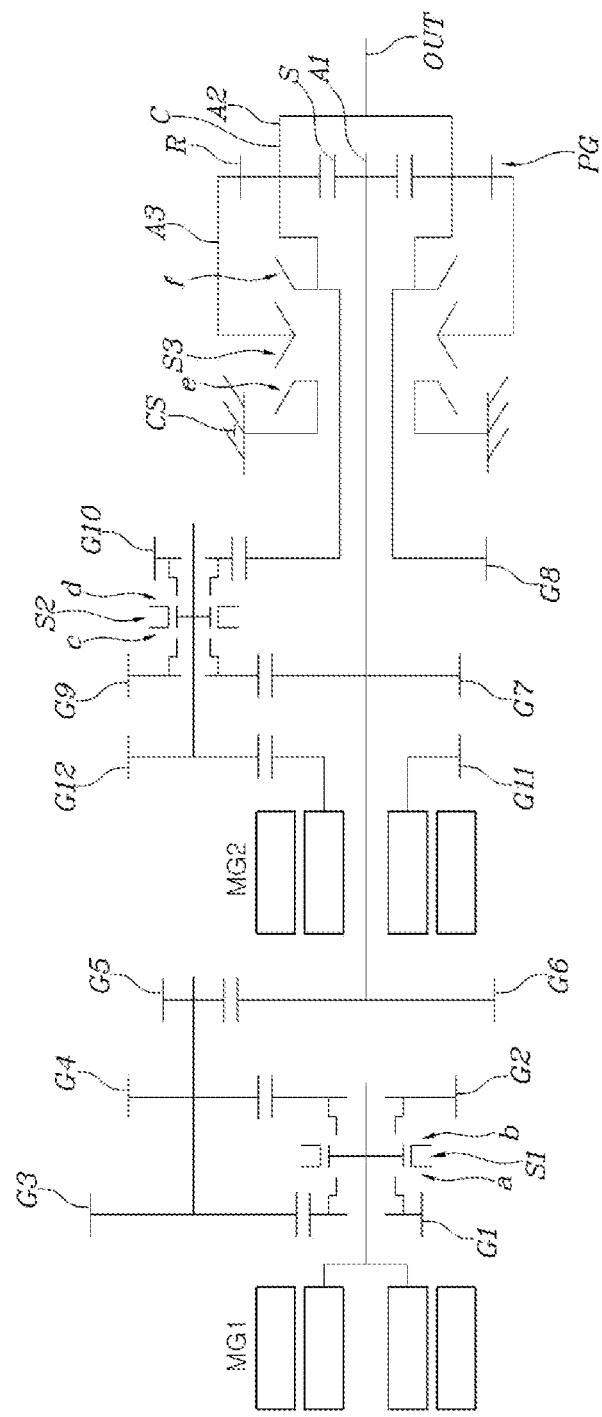
FIG. 1 is a diagram illustrating a first form of a powertrain for an electric vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
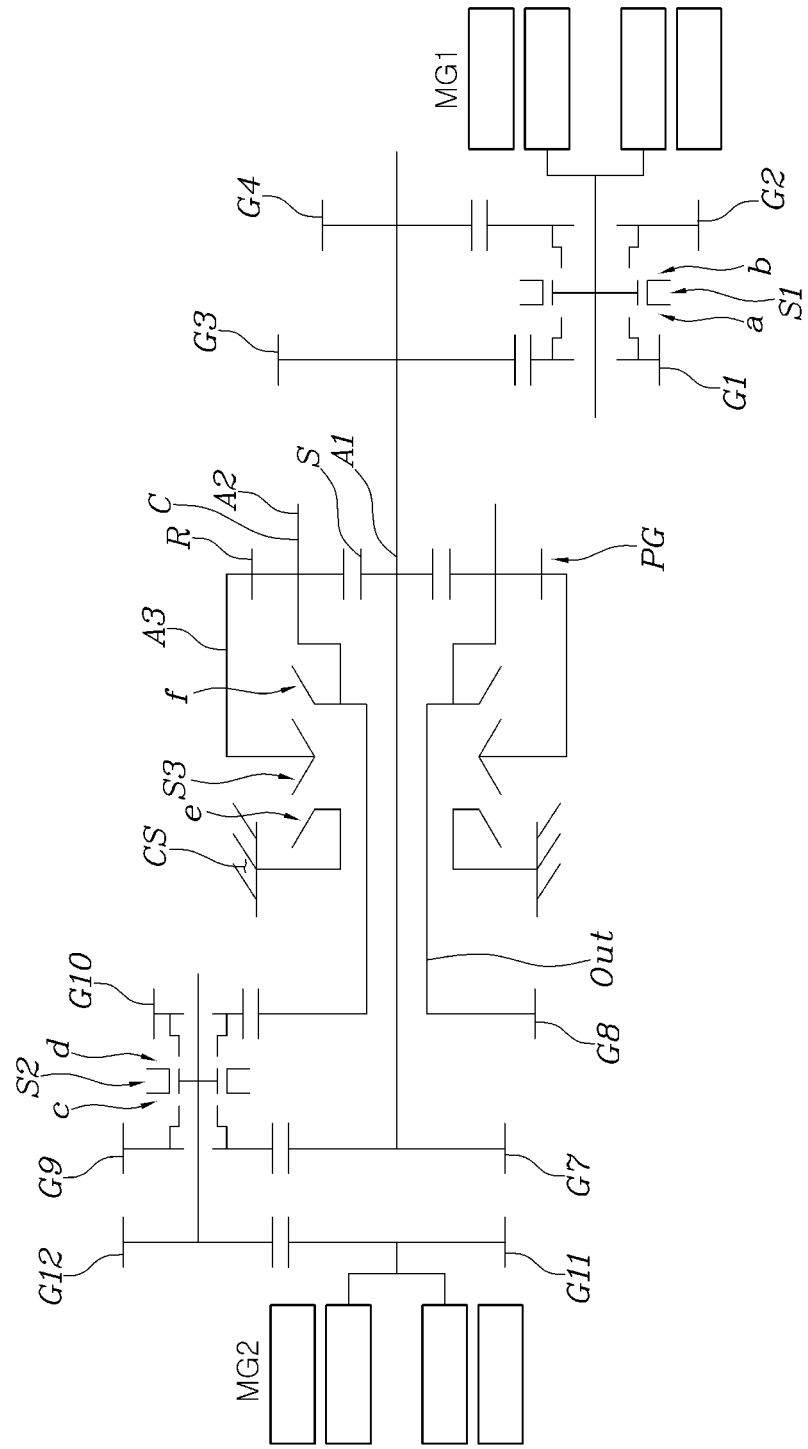
FIG. 2 is a diagram illustrating a second form of the powertrain for the electric vehicle according to the present disclosure.

Referring to FIGS. 1 and 2, first and second forms of a powertrain for an electric vehicle according to one form of the present disclosure commonly include: a planetary gear PG having three rotating elements (i.e., first, second and third rotating elements), where the first rotating element is connected to a first shaft A1 and the second rotating element is connected to a second shaft A2; a first motor MG1 installed to selectively supply power to the first shaft A1 at two or more gear ratios; a first shift assembly S1 configured to transfer power of the first motor MG1 to the first shaft A1 through one of two or more external engagement gear trains having different gear ratios; and a second motor MG2 installed to selectively supply power to the first shaft A1 and the second shaft A2.

The third rotating element of the planetary gear PG may be connected to a third shaft A3, and may be selectively connected to a transmission housing CS.

In addition, two rotating elements randomly selected from among the three rotating elements of the planetary gear PG may be connected to each other, such that the entire planetary gear PG can be rotated integrally.

Here, when the first shaft A1 is regarded as an input shaft to which power may be transmitted from the first motor MG1 and the second motor MG2 and the second shaft A2 is regarded as an output shaft to which power may be transmitted from the second motor MG2 and from which shifted power may be output, the present disclosure may considered to be configured such that power that the first motor MG1 provides to the input shaft in an adjusted manner and power that the second motor MG2 provides to the input shaft or the output shaft may be readjusted using the planetary gear PG before being output to the output shaft.

For reference, all of the first shaft A1, the second shaft A2, and the third shaft A3 are concentrically disposed as rotating shafts of the rotating elements of the planetary gear PG. The first rotating element of the planetary gear PG may be referred to as being a sun gear S, the second rotating element of the planetary gear PG may be referred to as being a carrier C, and the third rotating element of the planetary gear PG may be referred to as being a ring gear R.

For reference, the second shaft A2 in the drawings is expressed as OUT, and is shown to function as an output shaft to which power is output.

Forms of the present disclosure commonly include a third shift assembly S3 fixing the third rotating element of the planetary gear PG to the transmission housing CS or connecting the third rotating element of the planetary gear PG to the second shaft A2 by a linear displacement along the axial direction of the first shaft A1.

The third rotating element of the planetary gear PG is connected to the second rotating element via the second shaft A2, such that all of the rotating elements of the planetary gear PG may rotate integrally.

All of the rotating elements of the planetary gear PG may be configured to rotate integrally when the third shaft A3 is connected to the second shaft A2 as described above and when the third shaft A3 is connected to the first shaft A1 or the first shaft A1 and the second shaft A2 are connected.

The third shift assembly S3 may include, for example, a friction clutch able to produce a linear displacement by sliding linearly along the axial direction while the rotation thereof is restrained by the third shaft A3, so as to switch between a state in which the third rotating element of the planetary gear PG connected to the third shaft A3 is connected to the transmission housing CS and a state in which the third rotating element is connected to the second shaft A2.

The first form illustrated in FIG. 1 is configured to perform gear shifting through one of two or more external engagement gear trains having different gear ratios and then transfer power of the first motor MG1 to the first shaft A1.

That is, in first form, the first shift assembly S1 includes the gear engagement unit, the hub and the sleeve of which are disposed on the rotating shaft of the first motor MG1. The first gear G1 and the second gear G2 are rotatably provided on both sides of the hub. The third gear G3 in external engagement with the first gear G1 and the fourth gear G4 in external engagement with the second gear G2 are coaxially connected to each other. A fifth gear G5 is disposed on the shaft of the third gear G3 and the fourth gear G4 such that the rotation of the fifth gear G5 is restrained. A sixth gear G6 in external engagement with the fifth gear G5 is disposed on the first shaft A1 such that the rotation of the sixth gear G6 is restrained.

Accordingly, when the sleeve of the first shift assembly S1 is engaged with the clutch gear of the first gear G1 to establish connection therebetween, power provided by the first motor MG1 is transmitted to the first shaft A1 through the fifth gear G5 and the sixth gear G6 after gear shifting between the first gear G1 and the third gear G3. When the sleeve is engaged with the second gear G2 to establish connection therebetween, power provided by the first motor MG1 is transmitted to the first shaft A1 through the fifth gear G5 and the sixth gear G6 after gear shifting between the second gear G2 and the fourth gear G4.

Meanwhile, the second form illustrated in FIG. 2 differs from the first form in that power provided by the first motor MG1 is configured to be directly transmitted to the first shaft A1 after gear shifting through one gear of two external engagement gears having different gear ratios.

That is, the first shift assembly S1 includes a gear engagement unit, a hub and a sleeve of which are provided on a rotating shaft of the first motor MG1; a first gear G1 and a second gear G2 are rotatably provided on both sides of the hub, respectively; and each of a third gear G3 in external engagement with the first gear G1 and a fourth gear G4 in external engagement with the second gear G2 is disposed on the first shaft A1 such that rotation of the third gear and the fourth gear is restrained.

Therefore, in a state where the sleeve is connected to the first gear G1, power of the first motor MG1 is directly transferred to the first shaft A1 through gear shifting between the first gear G1 and the third gear G3. In a state where the sleeve is connected to the second gear G2, power of the first motor MG1 is directly transferred to the first shaft A1 through gear shifting between the second gear G2 and the fourth gear G4.

In addition, a seventh gear G7 is connected to and is restrained by the first shaft A1. An eighth gear G8 is connected to and is restrained by the second shaft A2. A ninth gear G9 in external engagement with the seventh gear G7 and a tenth gear G10 in external engagement with the eighth gear G8 are disposed coaxially with each other. The second motor MG2 is disposed to be connectable to the first shaft A1 and the second shaft A2 via the second shift assembly S2 disposed between the ninth gear G9 and the tenth gear G10.

For reference, the seventh gear G7 to the tenth gear G10 and the second shift assembly S2 are common components of both the first form and the second form. The second shift assembly S2 includes the gear engagement unit, the hub and the sleeve of which are disposed on the rotating shaft of the ninth gear G9 and the tenth gear G10.

Since the ninth gear G9 and the tenth gear G10 are respectively provided with a clutch gear in engagement with the sleeve of the gear engagement unit, the second shift assembly S2 substantially includes the gear engagement unit provided on the rotating shaft of the ninth gear G9 and the tenth gear G10, the clutch gear of the ninth gear G9, and the clutch gear of the tenth gear G10.

In addition, the rotating shaft of the second motor MG2 is disposed in parallel to the first shaft A1. The second motor MG2 is configured such that power provided by the second motor MG2 is transmitted to the first shaft A1 or the second shaft A2 through an eleventh gear G11 disposed on the rotating shaft of the second motor MG2 and a twelfth gear G12 in external engagement with the eleventh gear G11 to be coaxial with the ninth gear G9 and the tenth gear G10.

Accordingly, when the sleeve of the second shift assembly S2 is engaged with the clutch gear of the ninth gear G9, power provided by the second motor MG2 is transmitted to the first shaft A1 through the eleventh gear G11, the twelfth gear G12, the ninth gear G9, and the seventh gear G7. When the sleeve of the second shift assembly S2 is engaged with the clutch gear of the tenth gear G10, power provided by the second motor MG2 is transmitted to the second shaft A2 through the eleventh gear G11, the twelfth gear G12, the tenth gear G10, and the eighth gear G8.

For reference, in the first form illustrated in FIG. 1, the second motor MG2 is disposed such that the first shaft A1 passes through the interior of the second motor. Therefore, the eleventh gear G11 is disposed to be coaxial with the first shaft A1.

On the contrary, in the second form illustrated in FIG. 2, the second motor MG2 is not disposed coaxially with the first shaft A1.

Figure 3:
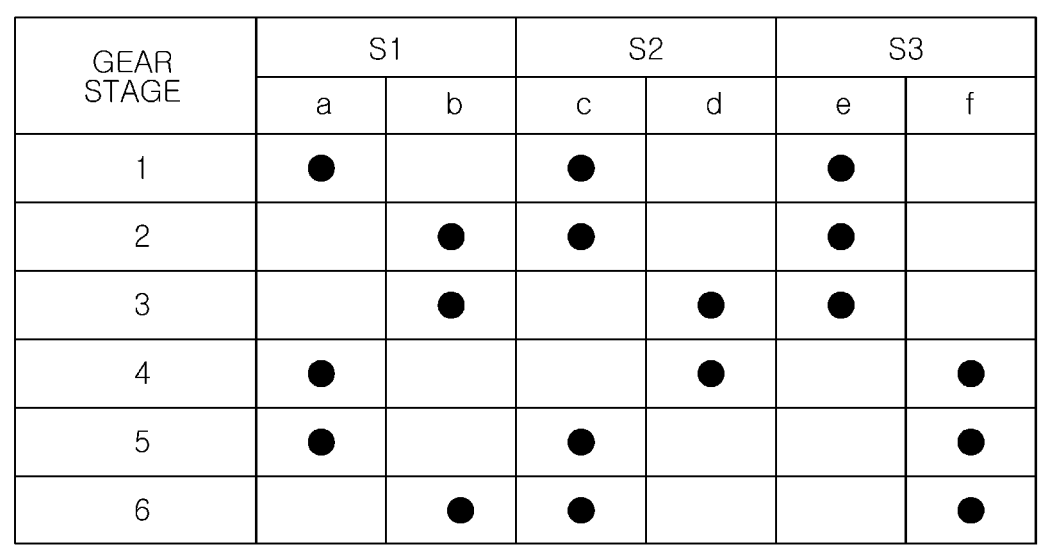

FIG. 3 is a table illustrating operating modes of first and second forms of the powertrain for an electric vehicle according to the present disclosure, in which a total of six gear stages are provided.

For reference, in the shift assemblies, "a" indicates a configuration in which the sleeve of the first shift assembly S1 connects or disconnects the clutch gear of the first gear G1 to and from power, "b" indicates a configuration in which the sleeve of the first shift assembly S1 connects or disconnects the clutch gear of the second gear G2 to and from power, "c" indicates a configuration in which the sleeve of the second shift assembly S2 connects or disconnects the clutch gear of the ninth gear G9 to and from power, "d" indicates a configuration in which the sleeve of the second shift assembly S2 connects or disconnects the clutch gear of the tenth gear G10 to and from power, "e" indicates the third shift assembly S3 being configured to connect or disconnect the third rotating element of the planetary gear PG to or from the transmission housing CS, and "f" indicates the third shift assembly S3 being configured to connect or disconnect the third rotating element of the planetary gear PG to or from the second shaft A2.

With reference to the form illustrated in FIG. 1, gear stages and gear shifting of the powertrain for an electric vehicle according to the present disclosure will be described. In the form illustrated in FIG. 2, gear shifting is performed substantially in the same manner.

The first gear stage is realized by fixing the third rotating element of the planetary gear PG to the transmission housing CS, engaging the sleeve of the first shift assembly S1 with the clutch gear of the first gear G1, and engaging the sleeve of the second shift assembly S2 with the clutch gear of the ninth gear G9.

Here, power provided by the first motor MG1 is transmitted to the first shaft A1 through the first gear G1, the third gear G3, the fourth gear G4, and the second gear G2. Power provided by the second motor MG2 is transmitted to the first shaft A1 through the eleventh gear G11, the twelfth gear G12, the ninth gear G9, and the seventh gear G7.

Accordingly, both the power provided by the first motor MG1 and the power provided by the second motor MG2 may be transmitted to the first shaft A1. Driving in the first gear may be realized using one motor of the two motors, depending on the driving condition of the vehicle.

Power transmitted to the first shaft A1 as described above is input from the first shaft A1 to the sun gear S, i.e. the first rotating element, and is reduced by the carrier C, i.e. the second rotating element, before being output to the second shaft A2, since a ring gear R, i.e. the third rotating element of the planetary gear PG, is fixed to the transmission housing CS by the third shift assembly S3.

The second shaft A2 is connected to one or more driving wheels via a separate differential device or the like, such that the vehicle can be propelled by power transferred as above.

Gear shifting from the first gear stage to the second gear stage is performed by disengaging the sleeve of the first shift assembly S1 from the clutch gear of the first gear G1 and engaging the sleeve of the first shift assembly S1 with the clutch gear of the second gear G2.

In this case, in a state in which the torque of the first motor MG1 is reduced while the second motor MG2 is allowed to continuously supply power, the sleeve of the first shift assembly S1 is disengaged to be in the neutral position and then is engaged with the clutch gear of the second gear G2, so that the gear shifting can be performed smoothly without torque interruption or shift shock.

That is, even in a state in which the sleeve of the first shift assembly S1 is disengaged to be in the neutral position, the power provided by the second motor MG2 is continuously supplied to the first shaft A1, so that torque can be continuously transmitted to one or more driving wheels to prevent torque interruption. During the disengagement and engagement of the sleeve of the first shift assembly S1, the torque of the first motor MG1 can be reduced or completely canceled. Consequently, the sleeve of the first shift assembly S1 can be smoothly and softly disengaged and engaged, so that excellent shifting feel can be obtained.

In the second gear stage realized as above, the power provided by the first motor MG1 is transmitted to the first shaft A1 directly through the sleeve of the first shift assembly S1, the second gear G2, the fourth gear G4, the fifth gear G5, and the sixth gear G6 and is then reduced by the planetary gear PG before being output to the second shaft A2.

Gear shifting from the second gear stage to the third gear stage is performed by disengaging the sleeve of the second shift assembly S2 from the clutch gear of the ninth gear G9 and engaging the sleeve of the second shift assembly S2 with clutch gear of the tenth gear G10.

Likewise, in a state in which the torque of the second motor MG2 is reduced or released while the first motor MG1 is allowed to continuously supply power to the first shaft A1, the sleeve of the second shift assembly S2 is disengaged from the clutch gear of the ninth gear G9 to be in the neutral position and then is engaged with the clutch gear of the tenth gear G10, so that the gear shifting can be performed smoothly without torque interruption or shift shock.

Consequently, the sleeve of the second shift assembly S2 is smoothly converted from a state in which the sleeve is engaged with the clutch gear of the ninth gear G9 to a state in which the sleeve is engaged with the clutch gear of the tenth gear G10 while the power provided by the first motor MG1 is being continuously supplied to the driving wheels, so that the gear shifting to the third gear stage is completed.

In the third gear stage, power provided by the first motor MG1 is input to the sun gear S of the planetary gear PG through the first shaft A1, and power provided by the second motor MG2 is input to the carrier C of the planetary gear PG through the second shaft A2.

Referring to FIG. 3, the fourth to sixth gear stages are realized in a state in which the third shift assembly S3 has connected the third rotating element of the planetary gear PG to the second shaft A2. That is, in the first to third gear stages, the third shift assembly S3 fixes the ring gear R, i.e. the third rotating element of the planetary gear PG, to the transmission housing CS, such that the power input to the sun gear S, which is the first rotating element of the planetary gear PG, is reduced before being output to the carrier C, i.e. the second rotating element, and the second shaft A2. In the fourth to sixth gear stages, the third shift assembly S3 connects the third rotating element of the planetary gear PG to the second rotating element via the second shaft A2, such that the power input to the planetary gear PG is output without reduction or increase in speed.

For gear shifting from the third gear stage to the fourth gear stage, canceling the torque of the first motor MG1 and controlling the first shift assembly S1 to be in the neutral position are performed from a state in which the third shift assembly S3 has fixed the third rotating element of the planetary gear PG to the transmission housing CS in the third gear stage, the third rotating element of the planetary gear PG is connected to the second shaft A2 via the third shift assembly S3, and then the first shift assembly S1 is controlled to be engaged with the clutch gear of the first gear G1 from the neutral position. In this manner, power provided by the first motor MG1 is transmitted to the driving wheels, thereby completing the gear shifting into the fourth gear stage.

During the gear shifting as described above, the power provided by the second motor MG2 is continuously provided to the driving wheels through the second shaft A2, thereby preventing torque interruption.

Afterwards, gear shifting from the fourth gear stage to the fifth gear stage is performed. In a state in which the first motor MG1 is continuously transmitting power to the driving wheels, the torque of the second motor MG2 is reduced, and the sleeve of the second shift assembly S2 is disengaged from the clutch gear of the tenth gear G10 and then is engaged with the clutch gear of the ninth gear G9.

In addition, gear shifting from the fifth gear stage to the sixth gear stage is performed. In a state in which the second motor MG2 is continuously supplying power to the driving wheels, the sleeve of the first shift assembly S1 is disengaged from the clutch gear of the first gear G1 and then is engaged with the clutch gear of the second gear G2.

As described above, also in the gear shifting from the fourth gear stage to the fifth gear stage and the gear shifting from the fifth gear stage to the sixth gear stage, shifting can be performed in a state in which one more of the first motor MG1 and the second motor MG2 can continuously transmit power to the driving wheels, thereby preventing torque interruption and obtaining smooth shifting feel.

Further, a powertrain for an electric vehicle according to the present disclosure as described above is configured to use an automated manual transmission (AMT) mechanism to transfer power of a motor to a driving wheel and thus shows an excellent power transfer efficiency, thereby maximizing fuel efficiency of an electric vehicle.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A powertrain for an electric vehicle, the powertrain comprising:
   a planetary gear having a first rotating element, a second rotating element, and a third rotating element, wherein the first rotating element is connected to a first shaft and the second rotating element is connected to a second shaft;
   a first motor configured to selectively supply power to the first shaft at two or more gear ratios;
   a first shift assembly configured to transfer power of the first motor to the first shaft through one of two or more external engagement gear trains having different gear ratios; and
   a second motor configured to selectively supply power to the first shaft and the second shaft,
   wherein:
   the first shift assembly includes a gear engagement unit, a hub and a sleeve of which are provided on a rotating shaft of the first motor;
   a first gear and a second gear are rotatably provided on both sides of the hub, respectively;
   a third gear in external engagement with the first gear and a fourth gear in external engagement with the second gear are coaxially connected to each other via a shaft;

a fifth gear is disposed on the shaft of the third gear and the fourth gear such that rotation of the fifth gear is restrained; and a sixth gear in external engagement with the fifth gear is disposed on the first shaft such that rotation of the sixth gear is restrained.

2. The powertrain of claim 1, wherein:

the third rotating element of the planetary gear is selectively connected to a transmission housing; and two rotating elements among the first, second and third rotating elements of the planetary gear are selectively connected to each other and configured to integrally rotate the entire planetary gear.

3. The powertrain of claim 1, wherein:

a seventh gear is connected to the first shaft such that rotation of the seventh gear is restrained;

an eighth gear is connected to the second shaft such that rotation of the eighth gear is restrained;

a ninth gear in external engagement with the seventh gear and a tenth gear in external engagement with the eighth gear are disposed coaxially with each other; and the second motor is disposed to be connectable to the first shaft and the second shaft via a second shift assembly disposed between the ninth gear and the tenth gear.

4. The powertrain of claim 3, wherein the second shift assembly includes a gear engagement unit, a hub and a sleeve of which are provided on a rotating shaft of the ninth gear and the tenth gear.

5. The powertrain of claim 4, wherein:

the second motor is disposed such that a rotating shaft of the second motor is parallel to the first shaft; and the power provided by the second motor is transmitted to the first shaft or the second shaft through an eleventh gear disposed on the rotating shaft of the second motor and a twelfth gear in external engagement with the eleventh gear and disposed coaxially with the ninth gear and the tenth gear.

6. The powertrain of claim 5, wherein:

the second motor is disposed such that the first shaft passes through an interior of the second motor; and the eleventh gear is disposed to be coaxial with the first shaft.

7. The powertrain of claim 2, further comprising a third shift assembly configured to fix the third rotating element of the planetary gear to the transmission housing or connect the third rotating element of the planetary gear to the second shaft by linear displacement in an axial direction of the first shaft.

8. A powertrain for an electric vehicle, the powertrain comprising:

a planetary gear having a first rotating element, a second rotating element, and a third rotating element, wherein the first rotating element is connected to a first shaft and the second rotating element is connected to a second shaft;

a first motor configured to selectively supply power to the first shaft at two or more gear ratios;

a first shift assembly configured to transfer power of the first motor to the first shaft through one of two or more external engagement gear trains having different gear ratios; and a second motor configured to selectively supply power to the first shaft and configured to selectively supply power to the second shaft while bypassing supply of power to the first shaft, wherein:

the first shift assembly includes a gear engagement unit, a hub and a sleeve of which are provided on a rotating shaft of the first motor;

a first gear and a second gear are rotatably provided on both sides of the hub, respectively; and each of a third gear in external engagement with the first gear and a fourth gear in external engagement with the second gear is disposed on the first shaft such that rotation of the third gear and the fourth gear is restrained.

9. A powertrain for an electric vehicle, the powertrain comprising:

a planetary gear having a first rotating element, a second rotating element, and a third rotating element, wherein the first rotating element is connected to a first shaft and the second rotating element is connected to a second shaft;

a first motor configured to selectively supply power to the first shaft at two or more gear ratios;

a first shift assembly configured to transfer power of the first motor to the first shaft through one of two or more external engagement gear trains having different gear ratios; and a second motor configured to selectively supply power to the first shaft and the second shaft, wherein:

a seventh gear is connected to the first shaft such that rotation of the seventh gear is restrained;

an eighth gear is connected to the second shaft such that rotation of the eighth gear is restrained;

a ninth gear in external engagement with the seventh gear and a tenth gear in external engagement with the eighth gear are disposed coaxially with each other; and the second motor is disposed to be connectable to the first shaft and the second shaft via a second shift assembly disposed between the ninth gear and the tenth gear.

* * * * *